(12) United States Patent
Pickett et al.

(10) Patent No.: US 11,937,528 B2
(45) Date of Patent: Mar. 26, 2024

(54) VIRTUAL SPAD METER

(71) Applicant: Deere & Company, Moline, IL (US)

(72) Inventors: Terence D. Pickett, Waukee, IA (US); Broughton C. Boydell, Pallamallawa (AU); Richard A. Humpal, Ankeny, IA (US); Steven Rees, Top Camp (AU)

(73) Assignee: Deere & Company

( * ) Notice: Subject to any disclaimer, the term of this patent is extended or adjusted under 35 U.S.C. 154(b) by 464 days.

(21) Appl. No.: 16/854,258

(22) Filed: Apr. 21, 2020

(65) Prior Publication Data

US 2021/0321555 A1 Oct. 21, 2021

(51) Int. Cl.
*H04N 5/33* (2023.01)
*A01B 69/00* (2006.01)
*A01B 79/00* (2006.01)
*A01B 79/02* (2006.01)
*G06N 20/00* (2019.01)
*G06T 7/11* (2017.01)
*H04N 23/11* (2023.01)

(52) U.S. Cl.
CPC .......... *A01B 79/005* (2013.01); *A01B 69/001* (2013.01); *A01B 79/02* (2013.01); *G06N 20/00* (2019.01); *G06T 7/11* (2017.01); *H04N 23/11* (2023.01); *G06T 2207/30188* (2013.01)

(58) Field of Classification Search
CPC ..... A01B 69/001; A01B 79/005; A01B 79/02; G06T 2207/30188; G06T 7/11; A01C 21/007
See application file for complete search history.

(56) References Cited

U.S. PATENT DOCUMENTS

| | | | |
|---|---|---|---|
| 8,391,565 B2 | 3/2013 | Purcell et al. | |
| 9,117,140 B2 | 8/2015 | Purcell et al. | |
| 2014/0001276 A1* | 1/2014 | Joergensen | A01M 21/043 239/69 |
| 2015/0015697 A1* | 1/2015 | Redden | A01G 7/00 382/110 |
| 2018/0242515 A1* | 8/2018 | Yajima | A01C 7/105 |
| 2020/0005038 A1* | 1/2020 | Logie | G06T 7/11 |
| 2020/0104988 A1* | 4/2020 | Baurer | G06F 16/5838 |
| 2020/0314320 A1* | 10/2020 | Bennette | H04N 5/2351 |
| 2021/0123728 A1* | 4/2021 | Smith | A01B 63/24 |

FOREIGN PATENT DOCUMENTS

| | | | |
|---|---|---|---|
| CN | 102809357 A | * | 12/2012 |
| EP | 3229577 B1 | | 6/2021 |
| WO | 2007/045199 A1 | | 4/2007 |

OTHER PUBLICATIONS

Extended European Search Report and Written Opinion issued in European Patent Application No. 21162384.8, dated Sep. 1, 2021, in 07 pages.

* cited by examiner

*Primary Examiner* — Md N Haque
(74) *Attorney, Agent, or Firm* — Tucker Ellis LLP (57) ABSTRACT

Systems and methods are provided for enhancing identification of crop conditions and execution of remedial actions in near real-time. An agricultural vehicle may include a crop analysis system having a computing device and an imaging array for capturing a set of images of a crop. The computing device analyzes images acquired by the imaging array to determine whether a crop experiences a particular condition. The computing device, when a condition is identified, can signal an agriculture machine to perform a remedial action.

15 Claims, 6 Drawing Sheets

VIRTUAL SPAD METER

BACKGROUND

One technique to identify nutrient stress in crops utilizes a SPAD meter to supplement physical observation of the crops. The SPAD meter, in particular, is useful to determine nitrogen-related stress in plants. The SPAD meter measures chlorophyll and, through measuring chlorophyll, an indirect measure of nitrogen can be made. Understanding nitrogen content of crops may facilitate schedule of fertilizer applications. In-field physical or manual inspection of crops is typically performed by a person knowledgeable in diagnosing plant stress initiators. Accordingly, determinations are typically accurate in that there is a high correlation between measurements/determinations and actual nutrient need. Such manual processes are time consuming and incur delays between decisions and applications.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation, a crop analysis system is provided. The crop analysis system includes an imaging array configured to acquire a set of images of a crop. The crop analysis system also includes a computing device having a processor executing computer-readable instructions to identify a condition of the crop based on the set of images acquired by the imaging array and signal an agricultural machine to perform an action based on the condition identified.

In another implementation, a crop analysis method is provided. The method includes acquiring a set of images of a crop. The set of images include one or more images of the crop having different modalities. The method also include processing the set of images to determine a condition of the crop and signaling an action in accordance with the condition determined.

In still another implementation, a non-transitory computer-readable storage medium having stored computer-executable instruction for an imaging processing application. The image processing application, when executed by a processor, configure the processor to acquire a set of images of a crop, the set of images being captured by an imaging array coupled to an agricultural vehicle while the agricultural vehicle traverse a field including the crop and select a crop feature included in one or more images from the set of images. The instructions further configure the processor to analyze image data, associated with the crop feature, from the set of images to determine a condition of the crop and signal an agriculture machine to execute an action based on the condition of the crop determined.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

Various non-limiting embodiments are further described in the detailed description given below with reference the accompanying drawings, which are incorporated in and constitute a part of the specification.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Figure 1:
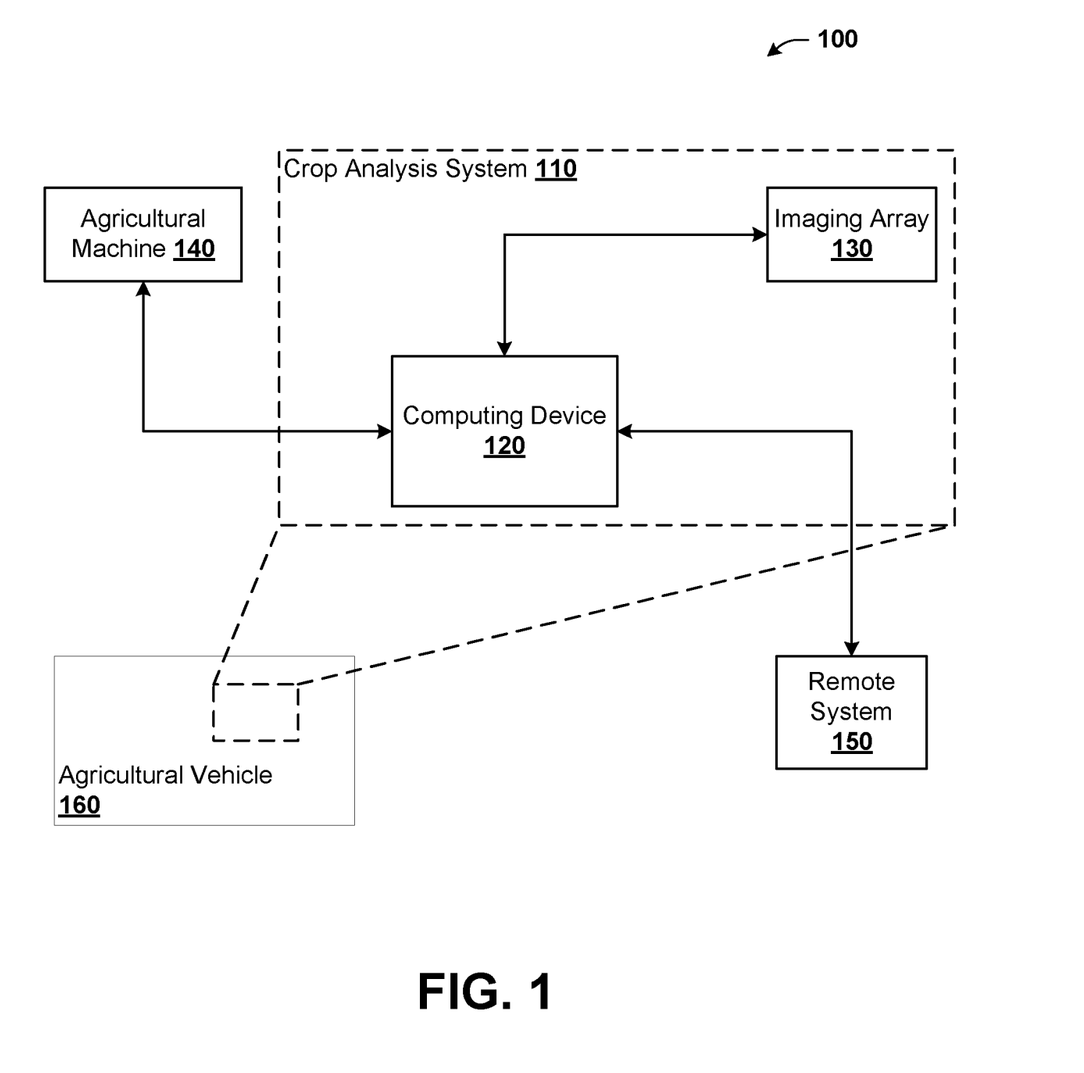
FIG. 1 illustrates an exemplary, non-limiting embodiment of an on-the-go system for determining a state of a crop and taking appropriate action according to various aspects.

Referring initially to FIG. 1, an agricultural system 100 for determining crop status is depicted. The system 100 may be included in or utilized by an agricultural vehicle 160, such as a tractor. As shown in FIG. 1, the system 100 includes a crop analysis system 110 and, in some embodiments, may additionally include an agricultural machine 140 and a remote system 150. The crop analysis system 110 includes an imaging array 130 and a computing device 120. It is to be appreciated that the crop analysis system 110, in one embodiment, is capable of performing measurements similar to a traditional spad meter. However, the system 110 can perform additional measurements and/or facilitate other crop status determination beyond the capabilities of traditional spad meters. Such additional features will be described herein.

According to an aspect, the imaging array 130 can acquire a set of images of one or more crops. For example, imaging array 130 can acquire the set of images of the one or more crops while the agricultural vehicle 160 moves through a field. The set of images may be provided to computing device 120 for processing. The computing device 120, in one example, may analyze the set of images to determine a status associated with the one or more crops. The analysis may be alternatively performed by the remote system 150. For instance, the computing device 120 can collect the set of images and communicate the images to the remote system 150 for processing. Still further, the computing device 120 and the remote system 150 can work jointly. The remote system 150, for example, may provide storage, processing, and/or communication support to computing device 120. For instance, the remote system 150 may enable notifications to be communicated to third parties, extend machine learning capabilities to the computing device 120, and/or provide distributed computing resources to facilitate image processing across a plurality of nodes. Accordingly, it is to be appreciated that particular features, steps, or capabilities described in connection with the computing device 120, may be performed by the remote system 150 in the alternative.

After determining the status associated with the one or more crops, the computing device 120 may execute an appropriate action in response. For instance, the computing device 120 may signal the agricultural machine 140 to perform an action. According to one example, the computing device 120 may be configured to determine if the one or more crops are experiencing nutrient stress (e.g. nitrogen-related stress) and, if so, signal the agricultural machine 140 to apply fertilizer to the one or more crops. The agricultural machine 140, in such instances, may be a spreader, a sprayer, or other apparatus capable of applying fertilizer to the one or more crops as directed by the computing device 120.

The computing device 120 may signal the agricultural machine 140 directly. Alternatively, the computing device 120 may notify an operator of the agricultural vehicle 160 (e.g. via a user interface) of status of the one or more crops. The operator may control the agricultural machine 140 to apply the fertilizer.

In another example, the computing device 120 may analyze images to identify statuses other than nutrient stress. For instance, the computing device 120 may be configured to identify insect damage, disease conditions, fungal infections, or other conditions. In response to a detection of such a status, the computing device 120 may signal the appropriate remedial action.

Still further, the status determined from the set of images may relate to a maturity of the one or more crops. In this example, the computing device 120 may determine that the one or more crops are ready for harvesting.

In the foregoing examples, the computing device 120 can be configured for a particular status or statuses to be identified in the one or more crops based on the set of images acquired by the imaging array 130. For instance, the computing device 120 may simultaneously ascertain a plurality of statuses based on the types of images included in the set of images from the imaging array 130. Some conditions or statuses may be determined from a particular image modality. When such images are provided by imaging array 130, the computing device 120 may analyze the images to determine the corresponding status.

According to one embodiment, system 100 is configured to acquire the set of images, process the set of images, determine one or more statuses of the one or more crops, and employ the agricultural machine 140 (if needed) in near real-time. For instance, as the agricultural vehicle 160 traverses a field, crop statuses can be continuously determined based on acquired images and remedial actions can be executed as determined.

Previous on-the-go systems capture a general image of an overall crop. Analysis of such an image often results in a poor correlation between measurements taken from the image and a status of the crop. By observing the plant as a whole, conventional systems lack focus on particular parts of the crop more relevant in identifying a given status. Moreover, such systems may overlook other localized effects that may causes stress, which leads to false indications.

Figure 2:
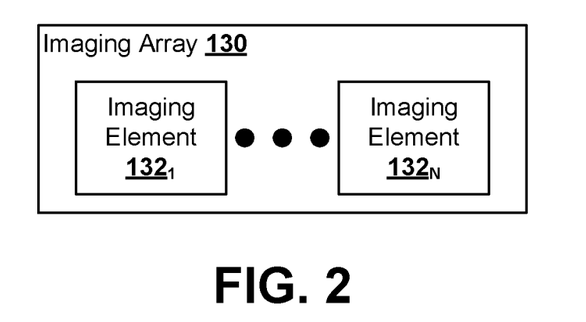
FIG. 2 illustrates an exemplary, non-limiting embodiment of an imaging array in accordance with an aspect.

Crop analysis system 110 provides improved identification of crop status, thereby optimizing remedial actions executed by system 100. In part, the improvements may be provided by the imaging array 130. Turning to FIG. 2, a non-limiting, exemplary embodiment of imaging array 130 is illustrated. As shown, imaging array 130 can include a set of imaging elements 132 including imaging element $132_1$ to imaging element $132_N$, where N is any integer greater than or equal to 1. Each imaging element 132 is configured to acquire an image and may include lenses and image sensors to facilitate image capture. In one embodiment, each imaging element 132 of imaging array 130 can capture respective images having different modalities. Modalities may include visible light, infrared light, ultraviolet light, spectrometry, radar, ultrasound, or the like. Accordingly, acquired images captured by the imaging array 130 may relate to exterior and/or interior characteristics of crops and provide information related to shape, size, orientation, color, absorption spectra, material composition, and/or internal structures.

Figure 3:
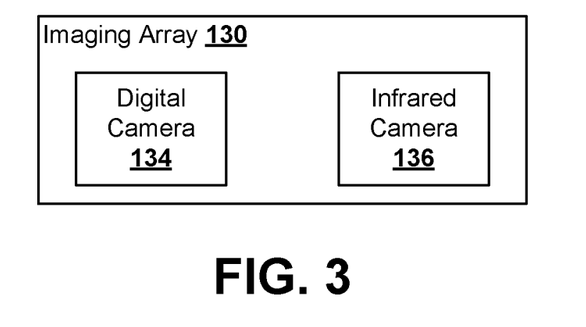
FIG. 3 illustrates an exemplary, non-limiting embodiment of an imaging array in accordance with an aspect.

Turning to FIG. 3, a non-limiting, exemplary embodiment of imaging array 130 is illustrated. In this embodiment, imaging array 130 may be configured to detect nutrient stress and include a digital (visible light) camera 134 and an infrared camera 136. The imaging array 130 may be a stereo camera in some embodiments. In another embodiment, the digital camera 134 and infrared camera 136 may respectively be mono cameras.

The digital camera 134 and the infrared camera 136 may capture respective images of a crop having substantially similar viewing areas. Based on the images, a normalized difference vegetative index (NVDI) image may be computed. For instance, based on measurements acquired by the digital camera 134, such as a reflectance of red light, and the infrared camera 136 (e.g. reflectance of near-infrared), the NVDI image can be acquired. In another aspect, the infrared camera 136 may be configured to output the NVDI image directly. For example, the infrared camera 136 may be a stereo camera capturing both a near-infrared image and at least a red wavelength of visible light. From these respective images, the NVDI image can be output.

The NVDI image may be sampled to improve measurement accuracy. A portion of the image (e.g. a subset of pixels) may form a basis of a measurement. For example, the measurement may be based on a portion of the image corresponding to a part of the crop sampled by a traditional spad meter. A color image from the digital camera 134 may be utilized to locate the portion of the NVDI image to be measured. For instance, machine learning can be employed on color images with appropriate training input (e.g. from an agronomist) to generate a trained algorithm that identifies a portion to sample for measurement. The measurement, as described above, can be indicative of nitrogen content of the crop. Nutrient stress (e.g. nitrogen-related stress in particular) can be determined based on the nitrogen content. When a plant is determined to exhibit nutrient stress based on the images, then fertilizer may be applied to the plant to remedy the condition.

More particularly, the color image may be evaluated to select an ideal leaf of a crop for sampling. An ideal leaf, as utilized herein, is a leaf of a crop that is suitable for analysis to determine a corresponding status of the crop. For instance, in the example of NVDI measurements for nutrient stress determinations, the ideal leaf may be a mature leaf of the crop that exposes a relatively large surface area to the imaging device. As mentioned above, such selection may be enhanced with machine learning techniques. After identification of the ideal leaf, one or more positions on the ideal leaf can be selected for sampling. As indicated above, sampling may involve selecting the one or more positions on the color image and analyzing corresponding pixels on the NVDI image to generate one or more measurements indicative of nutrient stress like a spad meter.

Figure 4:
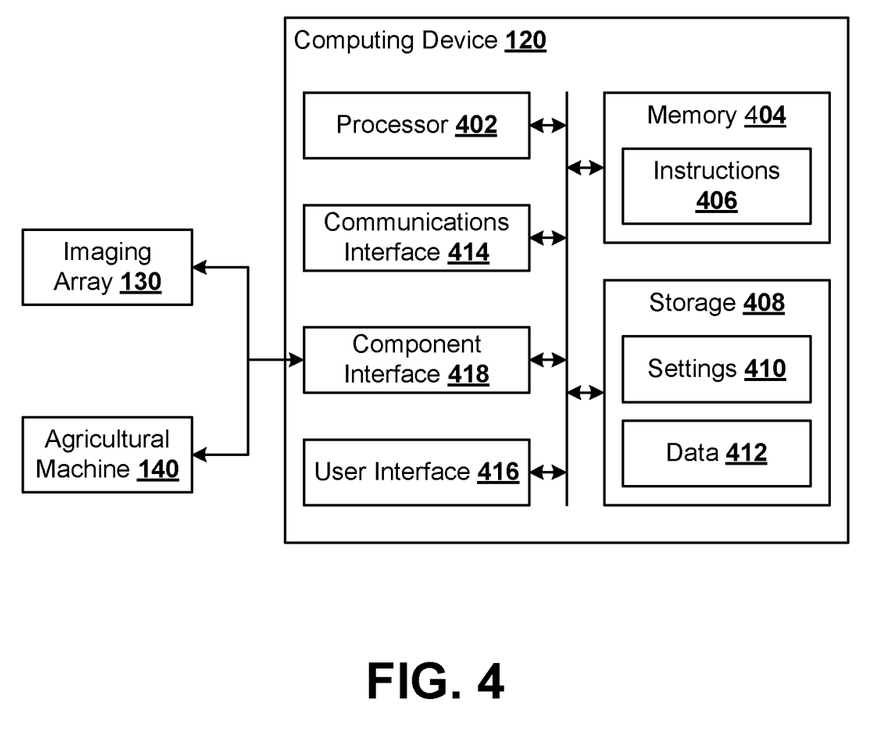
FIG. 4 illustrates an exemplary, non-limiting embodiment of a computing device for the on-the-go system according to various aspects.

As described above, analysis of the images may be performed by computing device 120 and/or remote system 150. Turning to FIG. 4, illustrated is a schematic block diagram of an exemplary, non-limiting embodiment for the computing device 120. Computing device 120 includes a processor 402 configured to execute computer-executable instructions 406 such as instructions composing an image analysis and crop status determination process for the agricultural system 100. Such computer-executable instructions 406 can be stored on one or more computer-readable media including non-transitory, computer-readable storage media such as memory 404. Memory 404 can also include other data (working data or variables) or portions thereof during execution of instructions 406 by processor 402.

The computing device 120 can also include storage 408 that can be, according to an embodiment, non-volatile storage to persistently store instructions 406, settings 410 (e.g. configuration settings) and/or data 412 (e.g., operational data, history data, image data from imaging array 130, learning models etc.).

The computing device 120 may also include a user interface 416 that comprises various elements to obtain user input and to convey user output. For instance, user interface 416 can comprise of a touch display, which operates as both an input device and an output device. In addition, user interface 416 can also include various buttons, switches, keys, etc. by which a user can input information to computing device 120; and other displays, LED indicators, etc. by which other information can be output to the user. Further still, user interface 416 can include input devices such as keyboards, pointing devices, and standalone displays.

The computing device 120 further includes a communications interface 414 to couple computing device 120, via the a communications network, to various devices such as, but not limited to, other computing device 120, remote system 150, agriculture machine 140, agricultural vehicle 160, imaging array 130, other controllers, servers, sensors, or Internet-enabled devices (e.g., IoT sensors or devices). Communication interface 414 can be a wired or wireless interface including, but not limited, a WiFi interface, an Ethernet interface, a Bluetooth interface, a fiber optic interface, a cellular radio interface, a satellite interface, etc.

A component interface 418 is also provided to couple computing device 120 to various components such as imaging array 130 and/or agriculture machine 140. Component interface 318 can include a plurality of electrical connections on a circuit board or internal bus of computing device 120 that is further coupled to processor 402, memory 404, etc. Component interface 318, in another embodiment, can be an interface for a CAN bus of agricultural vehicle 160. Further, the component interface 418 can implement various wired or wireless interfaces such as, but not limited to, a USB interface, a serial interface, a WiFi interface, a short-range RF interface (Bluetooth), an infrared interface, a near-field communication (NFC) interface, etc.

Figure 5:
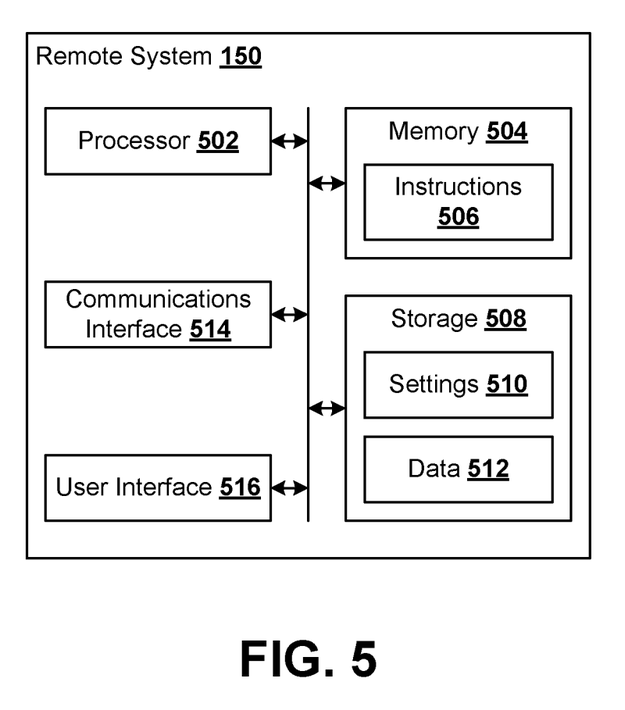
FIG. 5 illustrates an exemplary, non-limiting embodiment of a remote device for the on-the-go system according to various aspects.

Referring now to FIG. 5, illustrated is a schematic block diagram of an exemplary, non-limiting embodiment for the remote system 150. Remote system 150 includes a processor 502 configured to execute computer-executable instructions 506 such as instructions composing an image analysis and crop status determination process for the agricultural system 100. Such computer-executable instructions 506 can be stored on one or more computer-readable media including non-transitory, computer-readable storage media such as memory 504. Memory 504 can also include other data (working data or variables) or portions thereof during execution of instructions 506 by processor 502.

The remote system 150 can also include storage 508 that can be, according to an embodiment, non-volatile storage to persistently store instructions 506, settings 510 (e.g. configuration settings) and/or data 512 (e.g., operational data, history data, image data from imaging array 130, learning models, data from a plurality of systems 100, etc.).

The remote system 150 may also include a user interface 516 that comprises various elements to obtain user input and to convey user output. For instance, user interface 516 can comprise of a touch display, which operates as both an input device and an output device. In addition, user interface 516 can also include various buttons, switches, keys, etc. by which a user can input information to computing device 120; and other displays, LED indicators, etc. by which other information can be output to the user. Further still, user interface 516 can include input devices such as keyboards, pointing devices, and standalone displays.

In another example, remote system 150 may be a cloud-based system such that a conventional user interface may not be physically available to users (but available to system administrators for example). Accordingly, user interaction with the remote system 150 may occur via a communications interface 514. The communications interface 514 may couple remote system 150, via the a communications network, to various devices such as, but not limited to, other computing devices 120, agriculture machines 140, agricultural vehicles 160, imaging arrays 130, other controllers, servers, sensors, or Internet-enabled devices (e.g., IoT sensors or devices). Communication interface 514 can be a wired or wireless interface including, but not limited, a WiFi interface, an Ethernet interface, a Bluetooth interface, a fiber optic interface, a cellular radio interface, a satellite interface, etc.

Figure 6:
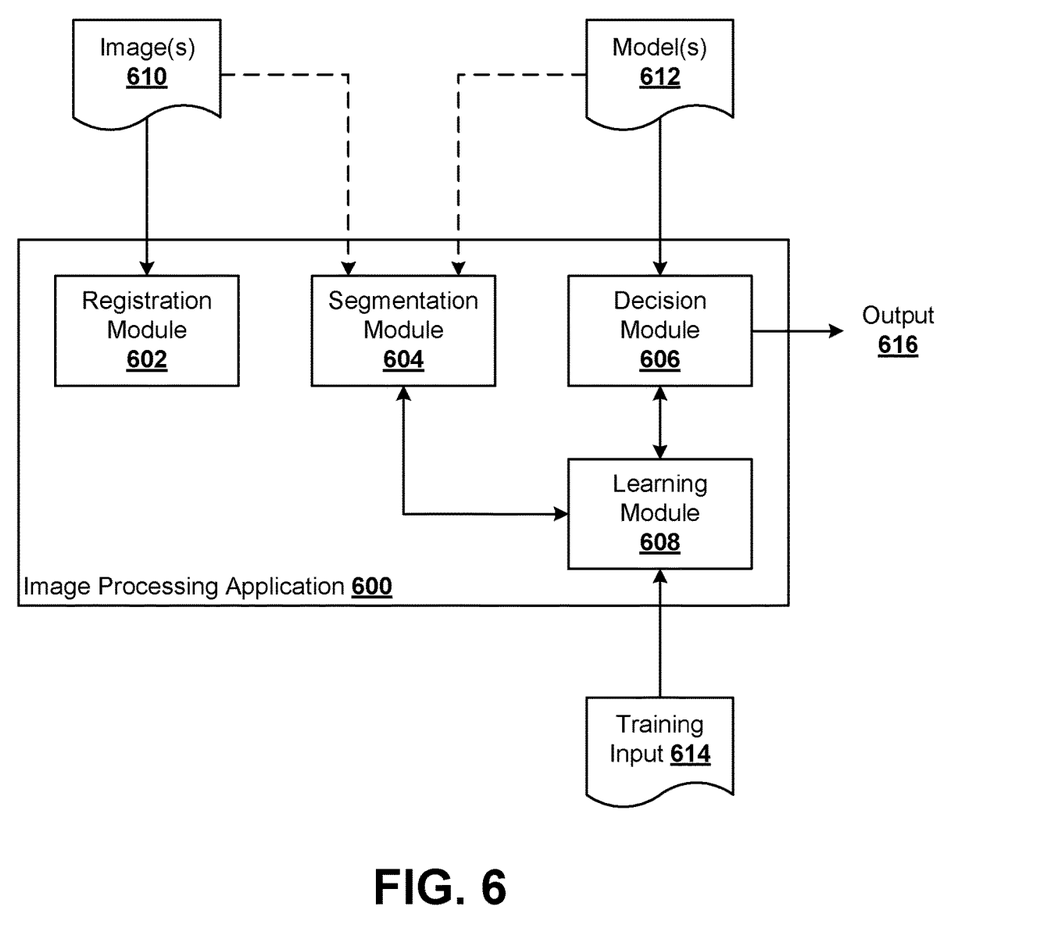
FIG. 6 illustrates an exemplary, non-limiting embodiment of an image processing application in accordance with one or more aspects.

As described above, crop analysis system 110 processes one or more images to improve measurements and identification of crop status. Referring to FIG. 6, an exemplary, non-limiting embodiment of an image processing application 600 is illustrated. The image processing application 600 may be executed by computing device 120 and/or remote system 150.

According to an embodiment, one or more images 610 are input to image processing application 600 and received by a registration module 602. In case of a plurality of images 610 input, the registration module 602 transforms the plurality of images via a registration algorithm to align the images based on corresponding features. If the plurality of images 610 have different modalities, registration facilitates measurement in one image of a first modality of a feature identifiable in a second image of a second modality. Post registration by registration module 602, the feature will have alignment such that corresponding pixels have corresponding positions. Registration module 602 may employ a rigid or non-rigid registration technique. A rigid technique involves linear transformations such as rotation, scaling, translation, and/or affine transformations. Non-rigid techniques are deformable or elastic and are not subject to the geometric constraints of linear transformations.

The registered imaged may be input to segmentation module 610. In another embodiment, registration may not be performed. In such cases, the one or more images 610 may be input to segmentation module 604.

The segmentation module 604 partitions images 610 into various image objects (e.g. sets of pixels). The image objects, for example, may correspond to individual parts of a crop such as stems, leaves, produce, etc. Segmentation module 604, in an embodiment, identifies individual leaves (even overlapping leaves) of the plant by detecting boundaries (e.g. lines, curves) of the image. In general, segmentation module 604 assigns each pixel to a particular image object.

Segmented image objects may be input to decision module 606, which generates output 616 according to one or more analysis concerns directed to the image processing application 600. For example, one such concern can be nutrient stress (particularly nitrogen related stress). For this analysis problem, decision module 606 can select at least one ideal leaf from the image objects identified by segmentation module 604. The ideal leaf, in an example, may be a mature leaf and may also have a broad surface generally directed to imaging array 130. The decision module 606 can sample one or more portions of the ideal leaf. The portions may correspond to portions of a leaf typically measured by a spad meter, for example. Based on the selected portions of the ideal leaf, the decision module 606 can perform measurements. Once such measurement may relate to chlorophyll health, which may be derived from an NDVI image. As discussed above, the NDVI image may be provided to image processing application 600 (as image 610), or may be generated by image processing application 600 based on an NIR image and a visible light image.

Based on the measurement of chlorophyll health, decision module 606 can determine whether the crop is experiencing nutrient stress. Accordingly, output 616 can indicate a presence of nutrient stress in the crop. Such output 616, as described above, can trigger a signal to agriculture machine 140 to apply fertilizer to the crop.

In a further embodiment, image processing application 600 can utilize machine learning and other artificial intelligence techniques in connection with the features described above. For example, models 612 can be provided to image processing application 600 to apply intelligence. Models 612 can be provided to improve identification and separation of image features by segmentation module 604 and may be provided to decision module 606 to enhance classification or measurement of image features in accordance with one or more agricultural concerns.

According to an aspect, models 612 can be developed with a learning module 608 that correlates output of segmentation module 604 and decision module 606 with training input 614 received from professionals, for example. The training input 614 can indicate a portion of a leaf suitable for measurement for chlorophyll health. The indication may be selected based on a digital image included in images 610. Training input 614 may also facilitate segmentation by providing feedback regarding which image pixels belong to which object of the image.

Figure 7:
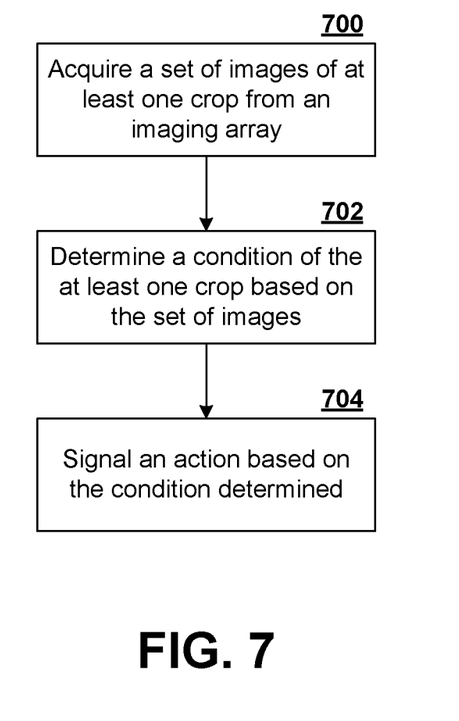
FIG. 7 is a flow diagram of an exemplary, non-limiting embodiment of a method for determining a state of a crop and taking appropriate action according to various aspects.

Referring now to FIG. 7, a method for determining a state of a crop and taking appropriate action is illustrated. The method may be performed by crop analysis system 110 described above. At 700, a set of images of at least one crop are acquired from an imaging array. The set of images may include images of different modalities from a plurality of imaging elements. At 702, a condition of the at least one crop is determined based on the set of images. The condition may be nutrient stress and, in particular, nitrogen-related stress. The condition may also be a disease condition or other stress-related condition. Moreover, the condition may be a maturity state of the at least one crop to facilitate harvesting decisions. In an example, the condition may be determined by image processing application 600 as described above with regard to FIG. 6.

At 704, an action is signaled based on the condition determined. For example, when nutrient stress is determined, the signal can trigger application of fertilizer. If the condition is a maturity state, the signal can schedule harvesting.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

The invention claimed is:

1. A crop analysis system, comprising:
an imaging array configured to acquire a set of images of a crop;
a computing device having a processor executing computer-readable instructions to configure the computing device to:
identify a condition of the crop based on the set of images acquired by the imaging array, wherein the computing device is further configured to select a feature of an image of the set of images corresponding to a portion of the crop and analyze the pixels of the image associated with the portion of the crop to identify the condition of the crop, and wherein the computing device is further configured to select, as the feature of the image corresponding to the portion of the crop, at least one mature leaf with a broad surface generally directed to the imaging array, and wherein the computing device is further configured to select one or more positions on the portion of the crop selected and analyze respective sets of pixels associated with the one or more positions selected to provide respective measurements for identifying the condition of the crop; and
signal an agricultural machine to perform an action based on the condition identified,
wherein the system is coupled to an agricultural vehicle and wherein the imaging array is further configured to acquire the set of images as the agricultural vehicle traverses a field including the crop.

2. The crop analysis system of claim 1, wherein the imaging array includes a plurality of imaging elements, wherein an imaging element of the imaging array is configured to capture an image having a respective modality.

3. The crop analysis system of claim 2, wherein the plurality of imaging elements include at least a digital camera and a near-infrared camera.

4. The crop analysis system of claim 1, wherein the condition relates to nutrient stress of the crop and the agricultural machine is configured to apply fertilizer to the crop.

5. The crop analysis system of claim 4, wherein the agricultural machine applies the fertilizer in real-time following acquisition of the set of images by the imaging array.

6. The crop analysis system of claim 1, wherein the computing device is further configured to utilize one or more machine learning models to facilitate selection of the feature of the image and identification of the condition of the crop.

7. A crop analysis method, comprising:
acquiring a set of images of a crop, wherein the set of images include one or more images of the crop having different modalities;
processing the set of images to determine a condition of the crop, wherein processing the set of images includes:
registering images of the set of images;
segmenting the images of the set of images;
selecting at least one part of the crop based on segmented images, wherein selecting the at least on part includes selecting one or more positions of the crop including at least one mature leaf with a broad surface generally directed to an imaging array acquiring the set of images; and
evaluating the at least one part of the crop selected based on corresponding image data to determine the condition of the crop, wherein evaluating includes analyzing respective sets of pixels associated with the one or more positions selected to provide respective measurements for identifying the condition of the crop; and
signaling an action in accordance with the condition determined, wherein acquiring the set of image and signaling the action are performed while an agricultural vehicle traverses a field including the crop.

8. The crop analysis method of claim 7, wherein the set of images include at least a digital image and a near-infrared image of the crop.

9. The crop analysis method of claim 8, further comprising generating a NDVI image based on at least one of the digital image or the near-infrared image.

10. The crop analysis method of claim 9, further comprising acquiring a measurement of chlorophyll health of the crop based on the NDVI image.

11. The crop analysis method of claim 10, further comprising determining whether the crop is experiencing nutrient stress based on the measurement.

12. The crop analysis method of claim 11, further comprising signaling an agricultural machine to apply fertilizer to the crop when the crop is determined to be experiencing nutrient stress.

13. The crop analysis method of claim 7, further comprising applying machine learning models to at least one of segmenting the images, selecting the at least one part of the crop, or evaluating the at least one part of the crop.

14. The crop analysis method of claim 13, further comprising building the machine learning models based on training input received based on the set of images acquired.

15. A non-transitory, computer-readable storage medium having stored thereon computer-executable instructions for an image processing application, the image processing application, when executed by a processor, configure the processor to:
acquire a set of images of a crop, the set of images being captured by an imaging array coupled to an agricultural vehicle while the agricultural vehicle traverse a field including the crop;
select a crop feature included in one or more images from the set of images, wherein the crop feature selecting includes at least one mature leaf with a broad surface generally directed to an imaging array capturing the set of images;
analyze image data, associated with the crop feature, from the set of images to determine a condition of the crop; and
signal an agricultural machine to execute an action based on the condition of the crop determined,
wherein the condition determined relates to nutrient stress, the image data analyzed is NDVI information based on the set of images, and agricultural machine is configured to apply fertilizer to the crop.

* * * * *